(12) United States Patent
Dabiri et al.

(10) Patent No.: US 8,545,168 B2
(45) Date of Patent: Oct. 1, 2013

(54) TWO-DIMENSIONAL ARRAY OF TURBINES

(75) Inventors: John Oluseun Dabiri, Pasadena, CA (US); Robert W. Whittlesey, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 907 days.

(21) Appl. No.: 12/644,667

(22) Filed: Dec. 22, 2009

(65) Prior Publication Data

US 2010/0260604 A1 Oct. 14, 2010

Related U.S. Application Data

(60) Provisional application No. 61/168,085, filed on Apr. 9, 2009.

(51) Int. Cl.
*F03D 3/02* (2006.01)

(52) U.S. Cl.
USPC .............. 415/66; 416/6; 415/4.2; 415/4.4

(58) Field of Classification Search
USPC ............... 60/398; 416/6; 415/4.2, 4.4, 907, 415/60, 66, 143
See application file for complete search history.

(56) References Cited

U.S. PATENT DOCUMENTS

| | | | |
|---|---|---|---|
| 6,784,566 B2 * | 8/2004 | Thomas | 290/55 |
| 7,299,627 B2 * | 11/2007 | Corten et al. | 60/398 |
| 2007/0212225 A1 * | 9/2007 | Vanderhye | 416/197 A |

FOREIGN PATENT DOCUMENTS

| | | |
|---|---|---|
| JP | 20033288923 | 7/2003 |
| KR | 100715662 | 5/2007 |
| KR | 100737889 | 7/2007 |
| WO | 2008093921 | 8/2008 |

OTHER PUBLICATIONS

D. Weihs, "Some Hydrodynamical Aspects of Fish Schooling," Plenum Press, pp. 703-718 (1975).
PCT International Search Report for PCT/US2009/069205 filed on Dec. 22, 2009 in the name of California Institute of Technology.
PCT Written Opinion for PCT/US2009/069205 filed on Dec. 22, 2009 in the name of California Institute of Technology.

* cited by examiner

*Primary Examiner* — Nathaniel Wiehe
*Assistant Examiner* — Adam W Brown
(74) *Attorney, Agent, or Firm* — Steinfl & Bruno LLP

(57) ABSTRACT

Arrangements of turbines are described. The turbines are staggered or aligned in the downwind direction.

7 Claims, 2 Drawing Sheets

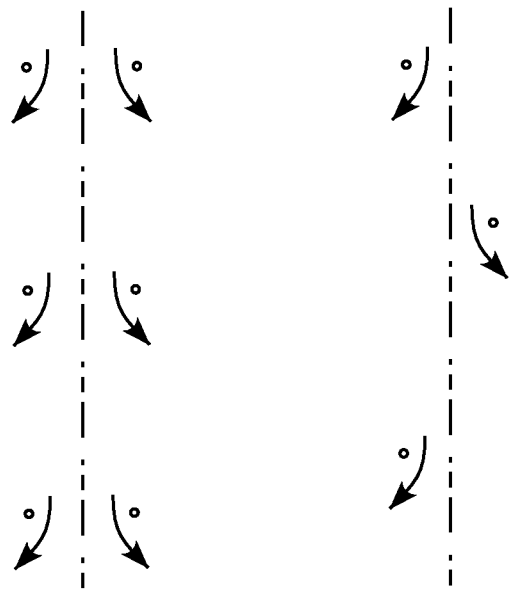
FIG. 2
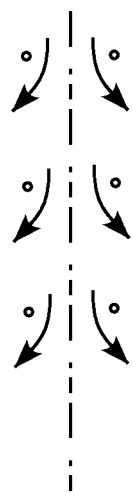 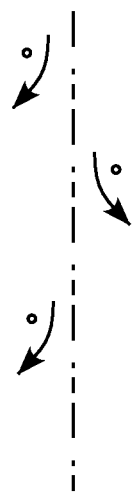 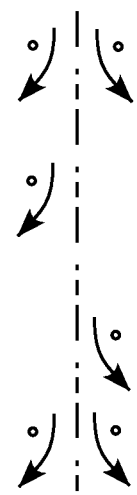
FIG. 3A     FIG. 3B     FIG. 3C

TWO-DIMENSIONAL ARRAY OF TURBINES

CROSS REFERENCE TO RELATED APPLICATIONS

The present application claims priority to U.S. Provisional Application No. 61/168,085 filed on Apr. 9, 2009, which is incorporated herein by reference in its entirety.

STATEMENT OF GOVERNMENT GRANT

The U.S. Government has certain rights in this invention pursuant to Grant No. CBET0725164 awarded by the National Science Foundation.

FIELD

The present disclosure relates to arrangements of turbines. More in particular, it relates to a two-dimensional array of turbines such as wind or water turbines to be used, for example, in a wind farm.

BACKGROUND

Wind turbines operate by transferring the motion of wind into the rotation of aerodynamic surfaces (e.g., airfoil blades) around a horizontal or vertical axis. The aerodynamic surfaces are connected to an electromechanical transducer (e.g., generator) that converts the mechanical kinetic energy of rotation into electrical energy. In order to avoid destructive aerodynamic interference between adjacent wind turbines that are arranged in an array on a wind farm, the turbines are typically spaced at least two rotor diameters apart both laterally and in the windward direction. This requirement results in significant land use by wind farms.

U.S. Pat. No. 6,784,566, incorporated herein by reference in its entirety, describes a method to achieve constructive aerodynamic interference between a pair of counter-rotating vertical-axis wind turbines (henceforth VAWTs).

SUMMARY

According to a first aspect, a two-column arrangement of turbines is provided, each column adapted to include clockwise rotating turbines and counter-clockwise rotating turbines, each column having a crosswind spacing from the other column and defining a first or second column centerline, a same crosswind distance across the column centerline from one side of the column centerline to another side of the column centerline, and a same downwind spacing along the column, the two-column arrangement comprising: first column turbines comprising clockwise rotating first column turbines and/or counterclockwise rotating first column turbines, and second column turbines comprising clockwise rotating second column turbines and/or counterclockwise rotating second column turbines, wherein the clockwise rotating first column turbines and the counterclockwise rotating first column turbines are adapted to be located on opposite sides of the first column centerline at half crosswind distance from the first column centerline; the clockwise rotating second column turbines and the counterclockwise rotating second column turbines are adapted to be located on opposite sides of the second column centerline at half crosswind distance from the second column centerline; the clockwise rotating first column turbines are adapted to be spaced from each other by the downwind spacing; the counterclockwise rotating first column turbines are adapted to be spaced from each other by the downwind spacing; the clockwise rotating second column turbines are adapted to be spaced from each other by the downwind spacing; the counterclockwise rotating second column turbines are adapted to be spaced from each other by the downwind spacing; the clockwise rotating first column turbines are downwind staggered with respect to the counterclockwise rotating first column turbines by half crosswind spacing; and the clockwise rotating second column turbines are downwind staggered with respect to the counterclockwise rotating second column turbines by half crosswind spacing.

According to a second aspect, a two-column arrangement of turbines is provided, each column adapted to include clockwise rotating turbines and counter-clockwise rotating turbines, each column defining a first or second column centerline, the two-column arrangement comprising: first column turbines comprising one or more clockwise rotating first column turbines and/or one or more counterclockwise rotating first column turbines, and second column turbines comprising one or more clockwise rotating second column turbines and/or one or more counterclockwise rotating second column turbines, wherein the one or more clockwise rotating first column turbines and the one or more counterclockwise rotating first column turbines are adapted to be located on opposite sides of the first column centerline; the one or more clockwise rotating second column turbines and the one or more counterclockwise rotating second column turbines are adapted to be located on opposite sides of the second column centerline; the one or more clockwise rotating first column turbines are downwind staggered with respect to the one or more counterclockwise rotating first column turbines; and the one or more clockwise rotating second column turbines are downwind staggered with respect to the one or more counterclockwise rotating second column turbines.

According to a third aspect, a column arrangement of turbines is provided, comprising: one or more clockwise rotating turbines and/or one or more counterclockwise rotating first column turbines, wherein the one or more clockwise rotating turbines and the one or more counterclockwise rotating turbines are adapted to be located on opposite sides of a column centerline.

According to a fourth aspect, an arrangement of turbines is provided, comprising: one or more clockwise rotating turbines on a first crosswind side of the arrangement, and one or more counter-clockwise rotating turbines on a second crosswind side of the arrangement, wherein the one or more clockwise rotating turbines are downwind staggered with respect to the one or more counterclockwise rotating turbines.

According to a fifth aspect, an arrangement of turbines is provided, comprising: one or more clockwise rotating turbines on a first crosswind side of the arrangement, and one or more counter-clockwise rotating turbines on a second crosswind side of the arrangement, wherein the one or more clockwise rotating turbines are downwind aligned with respect to the one or more counterclockwise rotating turbines.

According to some embodiments, the teachings of the present disclosure are directed to a configuration of a two-dimensional array (e.g., along two directions on a square plot of land) in order to optimize the constructive aerodynamic interference of the entire array.

In particular, some embodiments of the present disclosure are directed to a two-dimensional array of wind turbines that maximizes the constructive aerodynamic interference between adjacent wind turbines. The present disclosure addresses the arrangement of any number of wind turbines in two dimensions.

In some embodiments, the staggering of the turbines in successive rows according to the present disclosure allows to utilize the turbines themselves to re-orient the incoming wind after interaction with each row, such that the wind can be directed optimally toward each successive row of turbines, thus solving the front-row blockage problem which is due to lack of proper orientation of the wind towards the turbines after the wind interacts with the first row of turbines.

The person skilled in the art will understand that, in several embodiments, adaptation of the teachings of the present disclosure to non-analogous fields such as swimming fish, will involve constructing functional analogies between i) a swimming fish and the incoming wind, ii) the vortices created in the wake of a swimming fish and the wind turbines, iii) the friction interaction of the fish skin with the water and the motional constraint of the turbine pole that is applied to the rotating aerodynamic surfaces, also in view of the fact that the ambient water currents around the swimming fish have no functional analogy with the wind farm.

BRIEF DESCRIPTION OF THE DRAWINGS

FIG. 2 shows a top view of turbines according to a further embodiment of the present disclosure.

FIGS. 3A-3C show top views of turbines according to yet other embodiments of the present disclosure.

DESCRIPTION OF EXAMPLE EMBODIMENTS

Figure 1:
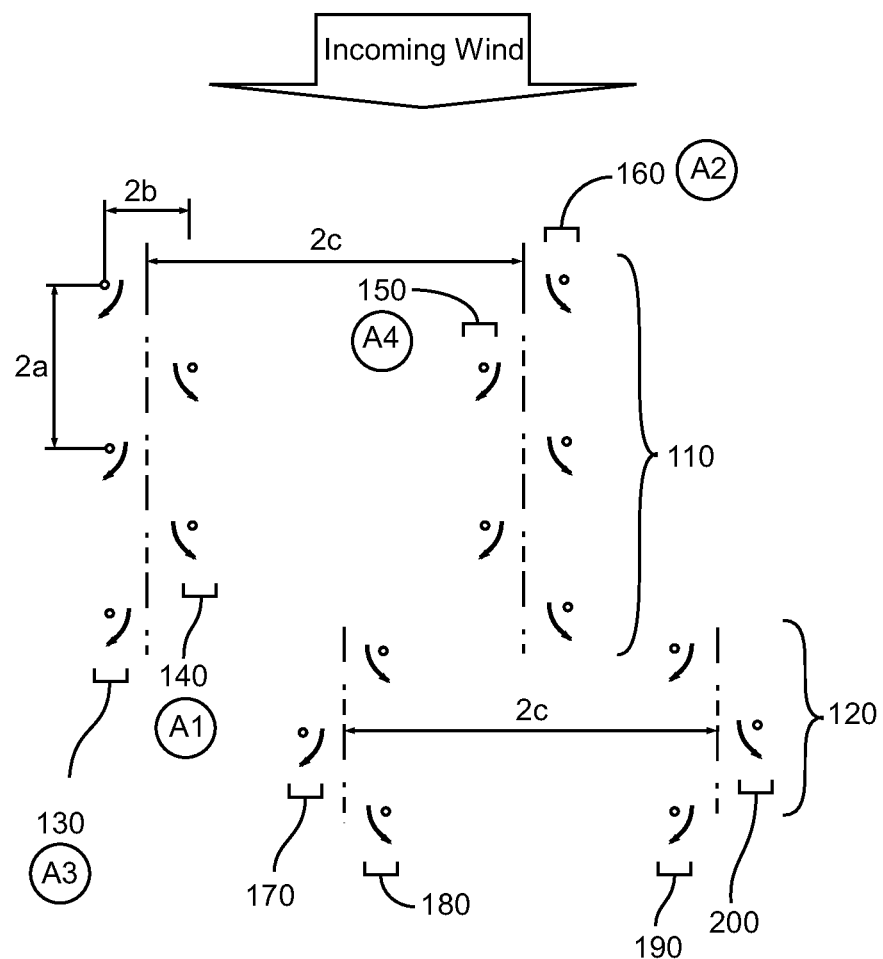
FIG. 1 shows a view of the top of the configuration of the array according to the present disclosure.

FIG. 1 shows a top view of an embodiment of the present disclosure, where an array of turbines is shown, comprised of subunits (110) and (120). In the embodiment of the figure, each subunit (110), (120) comprises two columns of turbines of arbitrary number of turbines, usually determined by the size of the plot of land on which the subunits are located. In the embodiment shown in FIG. 1, the length of subunit (110) (expressed in number of turbines along each column) is five, while the length of subunit (120) is three. The turbines can be, for example, wind or water turbines rotating on a vertical axis with respect to the horizon or ocean floor. Vertical axis wind turbines are also known as VAWTs. The turbines can be located, for example, in a wind farm, i.e. any plot of land containing more than one wind turbine.

Each column of turbines comprises clockwise rotating turbines and counter-clockwise rotating turbines. For example, the three turbines (130) and the two turbines (150) are clockwise rotating turbines, while the two turbines (140) and the three turbines (160) are counter-clockwise rotating turbines. Similarly, turbine (170) and turbines (190) are clockwise rotating turbines, while turbines (180) and turbine (200) are counter-clockwise rotating turbines.

Each column of subunit (110) or subunit (120) has a crosswind (i.e. perpendicular to the direction of the incoming wind) spacing (2c) from the other column and defines a respective column centerline. It can be noted from the embodiment of FIG. 1 that turbines (130) and (140) are located on opposite sides of the first column centerline of subunit (110). Similar considerations apply to turbines (150), (160), turbines (170), (180), and turbines (190), (200).

Turbines of opposite sides of a same column are separated by a crosswind distance (2b) across the column centerline. In the embodiment of FIG. 1, the crosswind distance is the same for each of the four columns shown in the figure. Moreover, turbines of a same column are located at half crosswind distance from their respective centerline.

Turbines of each side of a column along a downwind direction (i.e. in the same direction of the incoming wind) are separated by a downwind spacing (2a). In the embodiment of FIG. 1, the downwind spacing is the same for all turbines. Moreover, turbines of a same column are so positioned that clockwise rotating turbines on one side of the column are downwind staggered with respect to counter-clockwise rotating turbines on another side of the column.

The above described embodiment of FIG. 1 can be represented by the following equations A1-A4:

$$A_1 = -\frac{a}{2} + i(b + 4mc) + 2na, \text{ where } -\infty < m < \infty$$

$$A_2 = \frac{a}{2} + i(b + (4m+2)c) + 2na, \text{ where } 0 \le n < \infty.$$

$$A_3 = \frac{a}{2} + i(4mc - b) + 2na$$

and $$A_4 = -\frac{a}{2} + i((4m+2)c - b) + 2na.$$

A1 and A2 describe counter-clockwise rotating turbines, while A3 and A4 describe clockwise rotating turbines. As already mentioned with reference to FIG. 1, parameters a, b and c of equations A1-A4 describe half downwind spacing of the turbines, half crosswind distance of the turbines, and half crosswind spacing of columns, respectively. Equations A1-A4 are shown in a complex plane representation, where the real numbers represent placement in the vertical direction of FIG. 1, while the imaginary numbers represent placement in the horizontal direction of FIG. 1. Parameter m is an integer referring to the various of columns of the array. In FIG. 1, for example, m=0, 1 both for subunit (110) and subunit (120). Parameter n is an integer referring to the number of turbines in each column of the array. In FIG. 1, for example, n=0, 1, 2 for turbines (130) in accordance with equation A3, n=0, 1 for turbines (140) in accordance with equation (A1), n=0, 1 for turbines (150) in accordance with equation A4, and n=0, 1, 2 for turbines (160) in accordance with equation (A2).

With continued reference to the embodiment of FIG. 1, subunit (120) is located downstream of subunit (110) and shifted to the right. In other words, subunits may be terminated and reinitiated in a staggered position further downstream. The subunit (120) at the bottom of FIG. 1 has the same pattern as the subunit (110) at the top of the figure, but shifted to the right. The downstream distance and the shifting can be variable and are usually adjusted to improve performance in cases where the wind changes direction, or if the plot of land has an unusual shape or orientation relative to the wind direction. Performance is defined as the fraction of the available kinetic energy in the wind that is extracted by the turbines.

FIG. 2 shows a further embodiment of the present disclosure where some of the turbines are downwind aligned. Therefore, the person skilled in the art will understand that several embodiments of the present disclosure are possible, where the turbines are all downwind staggered, all downwind aligned, or in part downwind staggered and in part downwind aligned.

Moreover, embodiments of subunit comprising a single column of turbines are also possible. In such case, the turbines can be all aligned, all staggered, or partially staggered and partially aligned. See the embodiments of FIGS. 3A, 3B and 3C.

The person skilled in the art will understand that the parameters 2a, 2b, and 2c are to be selected so that the turbines cannot physically overlap. This will mean that parameters 2a and 2b should both be greater than the individual turbine diameter, and parameter 2c should be greater than twice the individual turbine diameter.

The applicants have also noted that the performance of the arrangement according to the present disclosure is especially enhanced when the turbines are in very close proximity to one other. This condition is for example satisfied when parameters a and b are not much larger than the turbine radius and c is not much larger than the turbine diameter. This condition is also satisfied when one or more of the following conditions are satisfied:
1) parameter a is less than the turbine diameter but greater than the turbine radius;
2) parameter b is less than the turbine diameter but greater than the turbine radius; and
3) parameter c is less than twice the turbine diameter but greater than twice the turbine radius.

Performance has already been defined above as the fraction of the available kinetic energy in the wind that is extracted by the turbines. This fraction is increased if the local wind speed is increased because the turbine consequently rotates faster, and the generator creates more electricity the faster that it rotates. When the turbines are in close spacing, the wind passing between them is accelerated and therefore the local wind speed is increased.

The performance of the arrangement of the present disclosure is improved for systems that rotate at high speed. In particular, when turbines rotate at high speed (defined as the airfoil speed at the radial extent of the turbine exceeding the incoming wind speed), they create a local wind field, in addition to the incoming wind, from which additional kinetic energy can be extracted. However, this local wind field can only be extracted by neighboring turbines if they are in close proximity.

While the embodiments of the present disclosure refer to rectangular patterns, the person skilled in the art will understand that other patterns are also possible.

The person skilled in the art will understand that the arrangements and arrays according to the present disclosure can still function if the wind direction shifts. Moreover, if the patterns and arrangements according to some embodiments of the present disclosure are symmetric along multiple directions, they will perform the same along each of those directions. By way of example, for a single-column design, the arrangement of the present disclosure could potentially perform the same in a north-south wind and in a south-north wind, once turbine rotational directions are properly assigned.

The person skilled in the art, will understand that the teachings of the present disclosure can be implemented using any turbine design, in arrays of two or more turbines. The quantitative effect on wind farm efficiency depends on the specific VAWT design. It is most effective for lift-based VAWTs, for which the constructive aerodynamic interference effect is larger. The invention is equally applicable to arrays of vertical-axis water turbines.

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the two-dimensional array of turbines of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A two-column arrangement of turbines,
   each column including clockwise rotating turbines and counter-clockwise rotating turbines,
   each column having a crosswind spacing from the other column and defining a first or second column centerline, a same crosswind distance across the column centerline from one side of the column centerline to another side of the column centerline, and a same downwind spacing along the column,
   the two-column arrangement comprising:
      first column turbines comprising clockwise rotating first column turbines and counterclockwise rotating first column turbines, and
      second column turbines comprising clockwise rotating second column turbines and counterclockwise rotating second column turbines,
   wherein
      all the clockwise rotating first column turbines and all the counterclockwise rotating first column turbines are located on opposite sides of the first column centerline at half crosswind distance from the first column centerline;
      all the clockwise rotating second column turbines and all the counterclockwise rotating second column turbines are located on opposite sides of the second column centerline at half crosswind distance from the second column centerline;
      the clockwise rotating first column turbines are spaced from each other by the downwind spacing;
      the counterclockwise rotating first column turbines are spaced from each other by the downwind spacing;
      the clockwise rotating second column turbines are spaced from each other by the downwind spacing;
      the counterclockwise rotating second column turbines are spaced from each other by the downwind spacing;
      the clockwise rotating first column turbines are downwind staggered with respect to the counterclockwise rotating first column turbines by half crosswind spacing; and
      the clockwise rotating second column turbines are downwind staggered with respect to the counterclockwise rotating second column turbines by half crosswind spacing.

2. The two-column arrangement of claim 1, wherein the turbines are selected from the group comprising wind turbines rotating on a vertical axis, and water turbines rotating on a vertical axis.

3. An array of turbines comprising a plurality of two-column arrangements of turbines according to claim 1.

4. The array of claim 3, wherein each two-column arrangement is vertically and/or laterally displaced with respect to the other two-column arrangements of the array.

5. The two-column arrangement of claim 1, wherein the turbines have a same turbine radius and one or more of the following conditions are satisfied:
- half downwind spacing between turbines is less than the turbine diameter but greater than the turbine radius;
- half crosswind distance between turbines is less than the turbine diameter but greater than the turbine radius; and
- half crosswind spacing between columns is less than twice the turbine diameter but greater than twice the turbine radius.

6. A two-column arrangement of turbines,
- each column includes clockwise rotating turbines and counter-clockwise rotating turbines,
- each column defining a first or second column centerline, the two-column arrangement comprising:
- a first column turbine arrangement comprising one or more clockwise rotating first column turbines and one or more counterclockwise rotating first column turbines, and
- a second column turbine arrangement comprising one or more clockwise rotating second column turbines and one or more counterclockwise rotating second column turbines, wherein
- the one or more clockwise rotating first column turbines and the one or more counterclockwise rotating first column turbines are located on opposite sides of the first column centerline, so that all clockwise rotating turbines of the first column turbine arrangement are located on a first side of the first column centerline and all counterclockwise rotating turbines of the first column turbine arrangement are located on a second side of the first column centerline;
- the one or more clockwise rotating second column turbines and the one or more counterclockwise rotating second column turbines are located on opposite sides of the second column centerline, so that all clockwise rotating turbines of the second column turbine arrangement are located on a first side of the second column centerline and all counterclockwise rotating turbines of the second column turbine arrangement are located on a second side of the second column centerline;
- the one or more clockwise rotating first column turbines are downwind staggered with respect to the one or more counterclockwise rotating first column turbines; and
- the one or more clockwise rotating second column turbines are downwind staggered with respect to the one or more counterclockwise rotating second column turbines.

7. A column arrangement of turbines comprising:
- one or more clockwise rotating turbines and one or more counterclockwise rotating turbines, wherein
- the column arrangement of turbines defining a column centerline, and
- the one or more clockwise rotating turbines and the one or more counterclockwise rotating turbines are located on opposite sides of a column centerline, so that all clockwise rotating turbines of the column arrangement are located on a first side of the column centerline and all counterclockwise rotating turbines of the column arrangement are located on a second side of the column centerline, wherein
- the one or more clockwise rotating turbines are downwind staggered with respect to the one or more counterclockwise rotating turbines.

* * * * *